United States Patent Office 3,138,069
Patented June 23, 1964

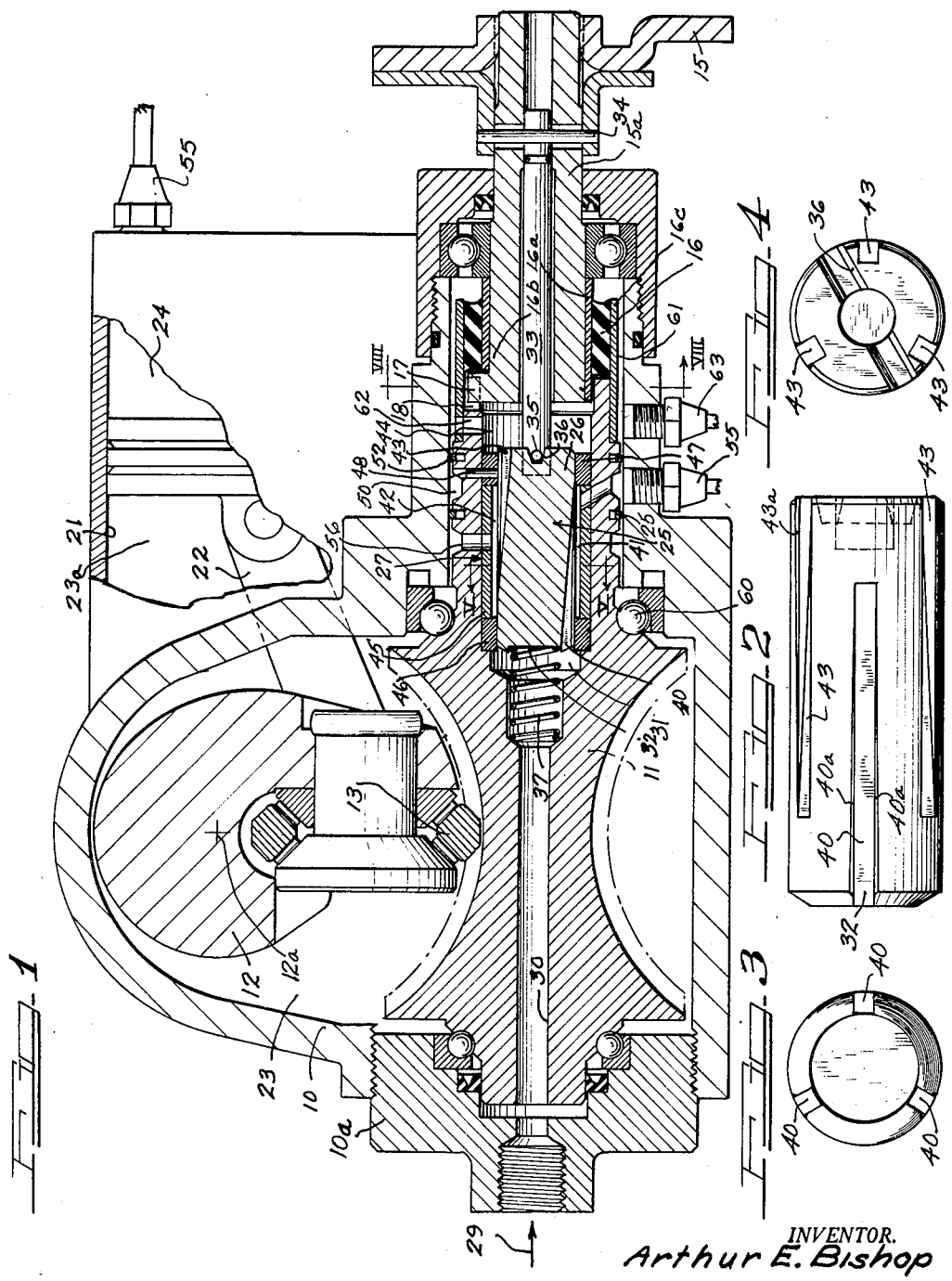

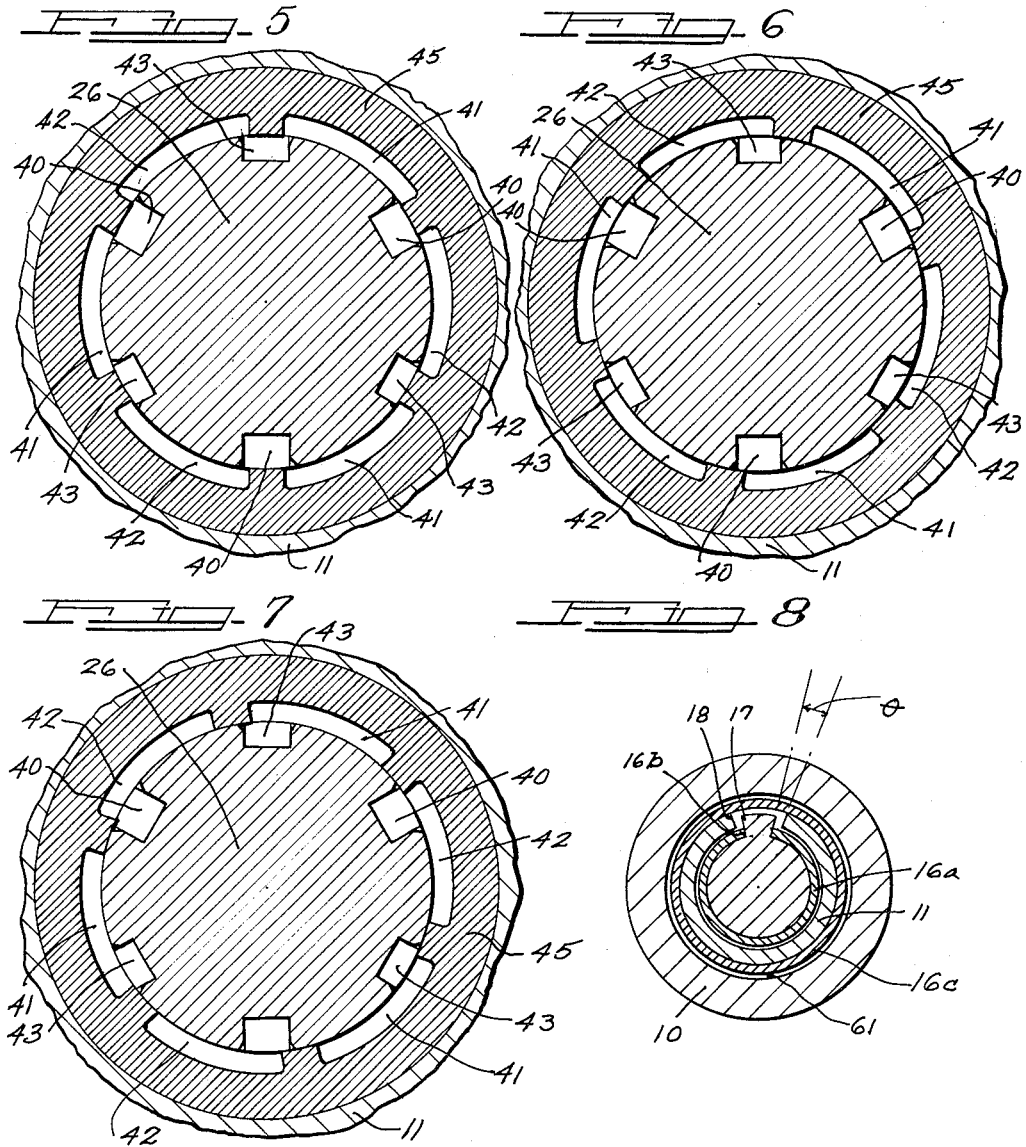

3,138,069
POWER STEERING SYSTEM
Arthur E. Bishop, 5515 Westwood Lane,
Birmingham, Mich.
Filed Jan. 16, 1961, Ser. No. 82,973
11 Claims. (Cl. 91—375)

The present invention relates to power steering apparatus and is, in a more particular sense, concerned with a provision of a greatly simplified yet very superior power steering control system for automotive vehicles.

As those skilled in the art of power steering are aware, many hundreds of power steering control systems have been proposed for use in automotive vehicles. In recent years a small number of such proposed designs have been commercially introduced and power steering has received wide public acceptance. These commercial power steering mechanisms have, however, been relatively expensive mechanisms. Additionally, they have typically been rather bulky and not completely satisfactory in valving performance. These disadvantages have become more acute from a practical standpoint with the present automotive trend toward smaller vehicles stressing economy of first cost and operation as well as easier handling.

It is, accordingly, a major purpose of the present invention to provide an extremely compact, relatively inexpensive and yet highly efficient power steering system control capable of extremely accurate power steering valve operation without undesirable valve chatter or flutter and which will consume a minimum of space. In accordance with this invention these objectives are attained through the employment of a novel rotary type power steering valve of extremely compact configuration and associated with an elastomeric resilient coupling capable of simultaneously providing the necessary "feel" and mechanically damping vibrations induced in the valve by road shocks and the passage of power steering fluid.

In a preferred embodiment of the invention the rotary valve comprises a cylindrical housing telescoping a rotary valve core. The valve core is relatively rotatable within the housing and is effectively connected thereto through the above mentioned elastomeric resilient coupling so that relative rotation between the housing and core are resisted resiliently throughout a predetermined small degree of angular rotation beyond which relative rotational movement is prevented by a positive mechanic connection. Hydraulic fluid under pressure from the power steering pump is introduced into the valve axially at one end of the core thereof and is simultaneously fed to a plurality of axial peripheral grooves on the core. Similarly, hydraulic fluid is vented from the valve to the sump of the pump by way of peripheral axially extending grooves opening at the end of the valve core opposite the pressure end. The sump grooves are spaced peripherally from the pressure grooves thereby providing a staggered arrangement of alternating pressure and sump grooves. Ports are provided in the cylindrical valve housing, on the internal face thereof, for directing pressure fluid to and from the opposite sides of the power steering motor. The cylinder grooves extend axially a fractional length of the valve core and slightly overlap both the pressure and sump grooves associated therewith when the valve core and housing are in their relative neutral positions. As a result of this construction no hydraulic fluid holes or passageways need be bored in the valve core and, further, no complicated high pressure leads need be applied to the valve housing. This results in a greatly reduced valve core size without a reduction in fluid flow capability. Further, since the pressure grooves and the sump grooves all open axially relative to the valve core, they may be machined by broaching, thereby substantially reducing the cost of the valve device.

A common fault of power steering valves is unwanted valve chatter or vibration. High frequency vibrations are often introduced into the steering system during turns and as a result of vehicle wheel movements. These are highly undesirable. However, frictional damping, oftentimes employed in power steering valves in the past to overcome such vibrations, very materially reduces the sensitivity of the steering valve and increases the recovery time required in returning a vehicle from a turn condition to a straight-ahead condition unassisted. In accordance with the present invention no friction damping is directly applied to the steering valve to provide damping. Instead, the valve is controlled, as above noted, by way of an elastomeric resilient connection between the valve housing and the valve core. This connection permits relative rotation upon the application of steering torques to the steering shaft. The rubber or other similar material employed in the elastomeric connection is provided with a high damping or hysteresis characteristic and it has been found that integration of damping into the resilient coupling provides very satisfactory elimination of valve chatter without materially affecting the response and recovery rates of the valve.

It is, accordingly, an object of the present invention to provide a simplified power steering valve and control therefor.

Another object of the invention is to provide a reduced diameter rotary power steering valve core capable of high volume flow control.

Still a further object of the invention is to provide a damped rotary power steering valve wherein such damping is achieved without the application of devices having static friction embodied therein.

Another object of the present invention is to provide a power steering system having improved sensitivity and response while substantially reducing the space required therefor as well as the cost of manufacture thereof.

A feature of the present invention resides in the manufacture of a rotary valve core having axially extending peripheral lands capable of simple manufacture by broaching.

Another feature of the invention is the provision of an elastomeric resilient control connection between a rotary power steering valve core and the cylindrical housing therefor, wherein the valve core motion relative to the housing is damped by provision of an elastomeric material having relatively high hysteresis loss.

Still other and further objects and features of the present invention will at once become apparent to those skilled in the art from a consideration of the herewith attached drawings wherein one embodiment of the invention is shown by way of illustration only, and wherein:

FIGURE 1 is a side-elevational view in cross-section of a power steering gear unit embodying the principles of the present invention;

FIGURE 2 is a side-elevational view of the valve core per se employed in the present invention;

FIGURE 3 is an end-elevational view of the left-hand end of the valve core viewed in FIGURE 2;

FIGURE 4 is a right-hand end-elevational view of the valve core shown in FIGURE 2;

FIGURE 5 is a cross-sectional view taken along the line V—V of FIGURE 1;

FIGURE 6 is a cross-sectional view taken along the line VI—VI of FIGURE 1;

FIGURE 7 is a cross-sectional view taken along the line VII—VII of FIGURE 1; and FIGURE 8 is a cross-sectional view taken along the line VIII—VIII shown in FIGURE 1 and more fully illustrating the resilient lost motion coupling of the present invention.

As shown on the drawings:

An integral power steering gear is illustrated in cross section in FIGURE 1. As there shown, a housing 10 supports a steering worm 11 which rotates cross shaft 12 by way of a rotary cam follower 13. The cross shaft 12 is connected by way of a pitman arm, not shown, to any conventional steering linkage in the usual manner such that rotation of the cross shaft 12 in either the clockwise or counterclockwise direction away from the straight-ahead neutral position illustrated, will cause a corresponding turning motion of the vehicle wheels. The worm 11 is rotated by the main vehicle steering shaft via a drive shaft 15. The connection between the worm 11 and the shaft connection 15 is somewhat yielding according to the present invention and includes a resilient bushing 16 which provides a limited lost motion under steering loads. A positive drive connection is provided in addition to the resilient coupling 16 and, in the embodiment illustrated, comprises a radial key 17 secured fixedly to the shaft connection 15 and a peripheral notch 18 provided in the worm 11. After a predetermined maximum design relative movement between the steering shaft and the worm, during which relative movement power steering valve operation occurs, a positive mechanical connection is provided at 17, 18, for further steering movement.

To the extent described above, the steering system, illustrated in FIGURE 1, provides a manual gear reduction unit provided with a slight amount of resilient lost motion. The lost motion provided enables application of the device to power steering arrangements wherein hydraulic power is applied to the cross shaft 12 or the steering linkage to supply a major fraction of the total torque required to rotate the cross shaft 12 and hence steer the vehicle. The specific form of power motor and its connection into the steering linkage may, of course, vary widely. For example, power may conveniently be applied to the cross shaft 12 by any conventional two-directional hydraulic motor operable by the application of hydraulic fluid under pressure to selectively opposite sides of the power motor. One form of power motor assembly readily adaptable to the present system is that illustrated in my previous Patent No. 2,865,218 dated December 23, 1958. As in the apparatus of that application, the power motor comprises a reciprocal piston 20 slidable in a cylinder 21 forming an integral part of housing 10. The piston 20 is connected by a connecting rod 22 to the cross shaft 12 for oscillation of the latter about the axis 12a. As in the case of the arrangement shown in the above-mentioned prior patent, the chamber 23 in which the worm 11 and follower 13 move is directly connected to the chamber 23a at the left side of the piston 20. Accordingly, pressurization of the piston chamber 23a to move the piston toward the right as viewed in FIGURE 1 is accomplished by pressurizing the chamber 23 while movement of the piston 20 in the left-hand direction as viewed in FIGURE 1 is accomplished by pressurizing chamber 24.

Pressurization of the power motor is acomplished in accordance with the present invention via an extremely simple and greatly improved power steering valve 25 which comprises a rotary valve core 26 rotatably secured within valve housing 27. The rotary core 26 is a slip fit relative to the housing 27 so that fluid seals between the two parts are unnecessary. Hydraulic fluid under pressure is introduced to the valve 25 by way of conduit 29 in the housing closure plug 10a. This pressure is transmitted through the worm 11 via conduit 30 to chamber 31 at which point it acts against end face 32 of valve core 26 biasing the valve core toward the right as viewed in FIGURE 1. Movement of the core is prevented, however, by rod 33 which is pinned to the steering shaft connection 15 by pin 34 and carries a drive pin 35 cooperating with slot 36 in the right-hand end of the core 26 whereby rotation of the steering shaft connection 15 rotates the core 26. As a result of the wedge shape of the slot 36 in combination with the pin drive 35, and the application of a positive pressure to the face 32 of the valve core, the core 26 is positively oriented relative to the steering shaft connection 15 in a manner eliminating all slack and preventing any unwanted vibrational movements of the core 26. Spring 37 provides a positive bias against the core 26 at all times so that at no time is the core 26 permitted any looseness of movement relative to the pin 35.

In accordance with the present invention, the valve core 26 may be of very small diameter. This is true since the fluid under pressure is applied axially thereof to a plurality of grooves 40. In the present instance there are three grooves 40 which direct the fluid under pump pressure from chamber 31 to valve housing chambers 41 and 42 as shown in FIGURES 5, 6 and 7. Similarly, housing chambers 41 and 42 are connected to a plurality, in the present case three in number, of pump grooves 43. It will be observed from a consideration of FIGURES 1 and 2 that grooves 40 and 43 axially overlap a distance approximately the axial length of the housing chambers 41 and 42 so that the only communication between chamber 31 and the sump chamber 44 comprises a path including the three grooves 40, the three grooves 43 and the overlapping cylinder grooves 41 and 42. It will be observed, accordingly, that although the valve of the present invention is a rotary valve, the flow into and away from the valve, respectively from and to the power steering pump is axial. As a result of this arrangement, and by varying the width of the grooves 40, 43, as required, a very large volume of hydraulic fluid may be handled with an extremely small diameter valve core 26. For example, it has been found in practice that a valve core 26 having a diameter of only ⅝" will adequately handle the requirements of a modern automotive vehicle power steering system. This compactness is extremely important in modern steering units where the size of the engine compartment into which an integral steering unit of the type herein illustrated is placed, is constantly being reduced by the automotive engineers.

In accordance with the present invention an equally compact and efficient valve sleeve or housing arrangement is provided. The cylinder ports 41 and 42 are provided by machining axial grooves or slots in a sleeve 45. The ends of the grooves 41 and 42 are blocked by annular rings 46, 47 and the parts 45, 46 and 47 are preferably press-fitted into the worm 11 in the manner illustrated. To prevent their axial rotational movement relative to the worm 11, each of these parts may be pinned in the manner illustrated at 48, to the worm 11.

As is clearly shown in FIGURE 1, the individual cylinder ports 41 are ported to an annular recess 50 sealed by sealing rings 51 and 52. The recess 50 is connected to the chamber 24 of the power motor by conduit 55. The grooves 42 are each ported to chamber 56 which is in direct communication with the chamber 23 past the ball bearings 60, and hence likewise in communication with chamber 23a of the power motor. Chamber 44 is ported to chamber 61 by way of port 62 and chamber 61 is in direct communication with the sump of the power steering pressure source by way of conduit 63. The pump may, of course, be of any conventional nature and is not illustrated.

It will be observed from a consideration of the valve structure above described that the valving function is performed by relative rotation between the valve core 26 and the housing 45. This rotation is permitted by the resilient-mechanical connection composed of the elastomeric annulus 16 and the mechanical stops 17, 18. The elastomeric annulus 16 is rigidly secured, preferably by bonding, to a metal sleeve 16a which is secured for rotation with the steering shaft 15a. This connection is provided by a pres fit coupled with the projection of stop member 17 into a notch 16b of the sleeve 16a. Similarly, the outer metallic sleeve 16c is rigidly secured to the worm 11 by any convenient means such as press fitting, staking or pinning. As a result of this construction, an initial application of steering torque to the shaft connection 15 by the vehicle operator, will cause a deflection of the elastomeric material 16 permitting rotation of the valve core 26 relative to the housing 45.

Operation of the control valve may readily be observed from a consideration of FIGURES 5, 6 and 7. In FIGURE 5 the core 26 and housing sleeve 45 are shown in their centered, straight-ahead relative positions. There, the respective grooves 40, 41, 42 and 43 are all in intercommunication thus providing a continuous flow power steering valve in which fluid under pressure applied at grooves 40 continuously flows to the sump of the pressure source via grooves 43. Upon a counterclockwise rotation of core 26 relative to the housing 45, the pressure ports 40 are connected directly to the cylinder ports 41 and hence chamber 24 while chamber 23a, connected to cylinder ports 42 is vented to the low pressure sump via grooves 43. This porting is illustrated in FIGURE 6. Conversely, clockwise positioning of the valve core 26 relative to the housing 45 directly connects the pressure ports 40 with cylinder ports 42 and chamber 23a while chamber 24 of the power motor is vented to the sump via grooves 43 in the manner illustrated in FIGURE 7.

In the FIGURES 5, 6 and 7, the relative rotation between the core 26 and the housing 45 is illustrative of the centered fully open position. In practice, it has been found that about 4° of relative rotation between the housing and the core is sufficient to provide closure of one set of ports with opening of the other set. As a safety precaution, the permitted relative rotation, in such a system, is limited by the mechanical stop members 17, 18, as shown in FIGURE 8. In an arrangement in which 4° is sufficient to provide full valve operation, it is satisfactory to provide approximately an 8° lost motion connection between the members 17 and 18, as indicated at θ in FIGURE 8.

In order to provide proper valve operation, the grooves 40 and 43 are not provided with planar, axially extending edges. Instead, these edges are rendered non-parallel to the axis of the valve by a chamfer or wedge cut illustrated respectively at 40a and 43a in the drawings. As a result of this slight angularity of edge surface, the opening and closing of the ports is provided in a gradual manner. Of course, the valve may be tailored in accordance with the principles set forth in my previous Patent No. 2,865,215 by varying the degree of angularity of the above-mentioned edges. Conversely, the lands between the grooves 41 and 42 may be beveled at an angle to provide such a relative non-parallel condition. The importance of this non-parallel construction is fully set forth in my above-mentioned earlier patent and is claimed therein.

It has been found in elaborate testing of automotive steering systems embodying a resilient lost motion that high frequency vibration often occurs in the valve. Thus, while a frequency of approximately 5 to 7 cycles per second may result from wheel shimmy and similar conditions, it has been found that a substantially higher frequency motion, in the range of 30 to 50 cycles per second will occur within the steering system and be reflected in movements of the power steering valve. The present invention provides for substantial elimination of such vibrations from the valve core and housing assembly so that the valving is not subject to high frequency valve chatter as in prior devices. Damping of both lower and upper frequency vibration is accomplished in accordance with the present invention through provision of elastomeric annulus 16 and without the presence of sliding friction or static friction devices of any sort positioned between the valve core 25 and housing 26. It has been my experience that the provision of a resilient lost motion connection without damping, between the valve parts, will provide an unstable valve susceptible to valve chatter or flutter and other high frequency vibrations in the range from 5 to 60 cycles per second. While it is possible to insert the static or friction means between the valve parts, such as for example O-ring seals or other similar friction inducing devices, such friction devices, which provide damping also provide high static friction which is extremely detrimental to good steering response. In accordance with the present invention no such static friction devices are provided and, instead, damping is built in to the rubber annulus 16 by direction of the elastomeric material to have a high dynamic damping modulus. This characteristic is conventionally considered as Yearzley resilience as identified in the standards of ASTM, D–945–55 entitled "Mechanical Properties of Elastomeric Vulcanizates Under Compressive or Shear Strains by the Mechanical Oscillograph." This resilience is expressed in percentage and generally reflects the amount of deflection to which an elastomeric part will return on its first cycle after release from a given initial deflection. In this regard it is noted that natural rubber has a Yearzley resilience in the general range of 80% to 90%, Neoprene has a Yearzley resilience in the range of approximately 75% to 85%, polyurethane has a Yearzley resilience approximating 50%, thus generally indicating an increase in damping characteristics with the respective materials above noted. As above indicated, the damping provided in the normal natural rubber is insufficient unless fillers or other compounds are added to it to bring its Yearzley resilience down substantially from the approximately 90% figure noted. It has been found that a Yearzley resilience either obtained through use of a material such as polyurethane, neoprene or the like, or compounded from natural rubber or other rubber materials having a very high Yearzley resilience by the addition of fillers, should comprise approximately 70% to provide satisfactory internal hysteresis or damping.

It will, accordingly, be seen that I have provided an improved, extremely compact and highly efficient power steering system. It will further be obvious to those skilled in the art that variations and modifications may be made in the structure illustrated without departing from the novel concepts of the present invention. It is, accordingly, my intention that the scope of the present invention be limited solely by that of the hereinafter appended claims.

I claim as my invention:

1. In combination in a power steering system having a hydraulic control valve, an axially fixed steering wheel shaft, an axially fixed steering output shaft, a lost motion connection between said shafts, said control valve having a valve housing rigidly carried with one of said shafts and a rotary valve core freely mounted in said housing and rigidly carried with the other shaft whereby relative rotation between said shafts causes valve movement, and an elastomeric damping means rigidly connected between said shafts and simultaneously resisting relative rotation of said core and housing away from a central position and damping external forces applied to said housing or said core.

2. In combination in a power steering system having a hydraulic control valve, an axially fixed steering wheel shaft, an axially fixed steering output shaft, a lost motion connection between said shafts, said control valve having a valve housing rigidly carried with one of said shafts and a rotary valve core freely mounted in said housing and rigidly carried for rotation with the other shaft whereby relative rotation between said shafts causes valve movement, and resilient centering means for maintaining said shafts in a centered relative position including an elastomeric damping means rigidly connected between said shafts for simultaneously damping vibrations applied to said valve core and supplying resilient bias tending to center said shafts.

3. In combination in a power steering system having a hydraulic control valve, an axially fixed steering wheel shaft, an axially fixed steering output shaft, means providing a lost motion connection between said shafts, said control valve having a cylindrical valve housing carried for rotation with one of said shafts and a rotary valve core freely mounted in said housing and secured for positive rotation with the other shaft whereby relative rotation between said shafts causes valve actuation, resilient means biasing said shafts into a centered relative position in which the valve is in a neutral condition and damping means associated with said biasing means and in addition to any sliding friction between said valve core and valve housing acting to damp high frequency oscillations imposed on one or the other of said shafts.

4. In combination in a power steering system having a hydraulic control valve, an axially fixed steering wheel shaft, an axially fixed steering output shaft, means providing a lost motion connection between said shafts, said control valve having a valve housing rigidly carried with said output shaft and a rotary valve core freely mounted in said housing and fixedly carried with said steering wheel shaft, resilient means biasing said shafts into a centered relative position in which the valve is in a neutral condition and damping means associated with said biasing means and in addition to any sliding friction between said valve core and valve housing acting to damp high frequency oscillations imposed on one or the other of said shafts.

5. In combination in a power steering system, a steering wheel shaft, a steering output shaft, means providing a limited motion lost motion connection between said shafts, a rotary steering valve comprising a valve housing secured for rotation with one of said shafts, a valve core secured for rotation with the other of said shafts, resilient means biasing said shafts into a centered relative position in which the valve core is in a neutral condition, said resilient means comprising an elastomeric material, and means eliminating all slack between said valve core and said elastomeric material whereby the inherent damping of said elastomeric material is effectively applied to said core.

6. In combination in a power steering system, a steering wheel shaft, a steering output shaft, means providing a limited lost motion connection between said shafts, a rotary steering valve comprising a valve housing secured for rotation with one of said shafts, a valve core secured within said housing for rotation with the other of said shafts, yielding pressure means constantly applied to said valve core urging it into immediate contact with said other shaft to provide a slack free connection therewith, a resilient centering means for maintaining said shafts in a centered relative position, and including an elastomeric annulus secured to both of said shafts.

7. In combination in a power steering system, a steering wheel shaft, a steering output shaft, means providing a limited lost motion connection between said shafts, a rotary steering valve comprising a valve housing secured for rotation with one of said shafts, a valve core secured within said housing for rotation with the other of said shafts, yielding pressure means constantly applied to said valve core urging it into immediate contact with said other shaft to provide a slack free connection therewith, a resilient centering means for maintaining said shafts in a centered relative position, and including an elastomeric annulus secured to both of said shafts, said valve housing and valve core co-operating to control the flow of hydraulic fluid under positive pressure and permitting such flow in the neutral or centered condition, and said yielding pressure means including said hydraulic fluid under pressure.

8. In combination in a power steering system including a source of hydraulic fluid under pressure, a power motor, and a power steering valve, a steering wheel shaft, a steering output shaft, means providing a limited lost motion connection between said shafts, said power steering valve comprising a valve housing secured for rotation with one of said shafts and a valve core secured for rotation with the other of said shafts, an elastomeric damping means rigidly connected to and between said shafts and simultaneously resisting relative rotation of said core and housing away from a central neutral position and damping external forces applied to said housing or said core, said connection between said core and said other shaft comprising an axially facing wedge connection and yieldable pressure means acting axially against said core to tighten said wedge connection, said last named pressure means including hydraulic fluid under pressure from said source.

9. In combination in a power steering system including a source of hydraulic fluid under pressure, a power motor, and a power steering valve, a steering wheel shaft, a steering output shaft, means providing a limited lost motion connection between said shafts, said power steering valve comprising a valve housing secured for rotation with one of said shafts, a valve core secured within said housing for rotation with the other of said shafts, means resisting relative rotation of said core and housing away from a central neutral position, said connection between said core and said other shaft comprising an axially facing wedge connection and yieldable pressure means acting axially against said core to tighten said wedge connection, said last named pressure means including hydraulic fluid under pressure from said source.

10. In combination in a power steering system including a source of hydralic fluid under pressure, a power motor, and a power steering valve, a steering wheel shaft, a steering output shaft, means providing a limited lost motion connection between said shafts, said power steering valve comprising a valve housing secured for rotation with one of said shafts, a valve core secured within said housing for rotation with the other of said shafts, means resiliently resisting relative rotation of said core and housing away from a central neutral position, said connection between said core and said other shaft comprising an axially facing wedge connection and pressure means acting axially against said core to tighten said wedge connection, said last named pressure means including hydraulic fluid under pressure from said source acting against one end face of said core, said valve core having a plurality of axially extending peripheral slots opening at said end face of said core for connection with said source and a like member of axially extending peripheral slots positioned intermediate between the slots carrying fluid under pressure and opening at the other end surface of said valve core, means venting the area at said other end of said valve core to a low pressure sump, a plurality of axially extending grooves in said housing equalling in number the total number of said axially extending grooves in said valve core and alternately connected to opposite sides of said motor, each of said grooves in said housing having a peripheral width slightly in excess of the width between adjacent grooves in said valve core.

11. In combination in a power steering system including a source of hydraulic fluid under pressure, a power motor, and a power steering valve, a steering wheel shaft, a steering output shaft, means providing a limited lost motion connection between said shafts, said power steering valve comprising a valve housing secured for rotation with one of said shafts, a valve core secured within said housing for rotation with the other of said shafts, means resiliently resisting relative rotation of said core and housing away from a central neutral position, said connection between said core and said other shaft comprising an axially facing wedge connection and pressure means acting axially against said core to tighten said wedge connection, said last named pressure means including hydraulic fluid under pressure from said source acting against one end face of said core, said valve core having a plurality of axially extending peripheral slots opening at said end face of said core for connection with said source and a like number of axially extending peripheral slots positioned intermediate between the slots carrying fluid under pressure and opening at the other end surface of said valve core, means venting the area at said other end of said valve core to a low pressure sump, a plurality of axially extending grooves in said housing equalling in number the total number of said axially extending grooves in said valve core and alternately connected to opposite sides of said motor, each of said grooves in said housing having a peripheral width slightly in excess of the width between adjacent grooves in said valve core, each of the grooves in said valve core having the edges thereof at the outer surface of the valve core chamfered in a plane non-parallel to the axis of said valve core.

References Cited in the file of this patent

UNITED STATES PATENTS

| | | |
|---|---|---|
| 2,691,283 | Stover | Oct. 12, 1954 |
| 2,720,764 | Landrum | Oct. 18, 1955 |
| 2,930,359 | MacDuff | Mar. 29, 1960 |
| 2,964,017 | Hruska | Dec. 13, 1960 |
| 2,967,980 | Ovshinsky | Jan. 10, 1961 |
| 2,988,059 | Wysong | June 13, 1961 |
| 3,022,772 | Zeigler et al. | Feb. 27, 1962 |